(12) United States Patent
Owejan et al.

(10) Patent No.: US 8,268,492 B2
(45) Date of Patent: Sep. 18, 2012

(54) FUEL CELL STACK FEATURES FOR IMPROVED WATER MANAGEMENT

(75) Inventors: Jon P. Owejan, Honeoye, NY (US); Steven R. Falta, Honeoye Falls, NY (US); Thomas W. Tighe, Bloomfield, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1327 days.

(21) Appl. No.: 11/948,519

(22) Filed: Nov. 30, 2007

(65) Prior Publication Data

US 2009/0142632 A1    Jun. 4, 2009

(51) Int. Cl.
  *H01M 8/24*  (2006.01)
  *H01M 2/18*  (2006.01)
(52) U.S. Cl. .......................... 429/414; 429/453; 429/469

(58) Field of Classification Search .................. 429/414, 429/453, 545, 469
See application file for complete search history.

(56) References Cited

U.S. PATENT DOCUMENTS

| 7,445,866 | B2* | 11/2008 | Sugiura et al. ................ 429/454 |
| 7,816,050 | B2* | 10/2010 | Farrington et al. ........... 429/459 |
| 2006/0110650 | A1 | 5/2006 | Sugiura et al. | |

FOREIGN PATENT DOCUMENTS

WO      2006023694 A1    2/2006

* cited by examiner

*Primary Examiner* — Tracy Dove
(74) *Attorney, Agent, or Firm* — Fraser Clemens Martin & Miller LLC; J. Douglas Miller

(57) ABSTRACT

An electric insulator for a fuel cell stack with a plurality of fuel cell plates is provided. The electric insulator includes an insulation layer having a water management feature adapted to militate against liquid water contacting the fuel cell plates. Fuel cell stacks having the water management feature are also described.

16 Claims, 4 Drawing Sheets

FUEL CELL STACK FEATURES FOR IMPROVED WATER MANAGEMENT

FIELD OF THE INVENTION

The present invention relates to fuel cell stacks and, more particularly, to a means for water management and removal from a fuel cell stack.

BACKGROUND OF THE INVENTION

A fuel cell has been proposed as a clean, efficient and environmentally responsible power source. Individual fuel cells can be stacked together in series to form a fuel cell stack. The fuel cell stack is capable of supplying a quantity of electricity sufficient to provide power to an electric vehicle.

One type of fuel cell is the Proton Exchange Membrane (PEM) fuel cell. The PEM fuel cell includes a membrane-electrode-assembly (MEA) that generally comprises a thin, solid polymer membrane-electrolyte having a catalyst and an electrode on both faces of the membrane-electrolyte. The PEM fuel cell typically includes three basic components: a cathode electrode, an anode electrode, and an electrolyte membrane. The cathode and anode typically include a finely divided catalyst, such as platinum, supported on carbon particles and mixed with an ionomer. The electrolyte membrane is sandwiched between the cathode and the anode to form the membrane-electrode-assembly (MEA).

The MEA is often disposed between porous diffusion media (DM) which facilitate a delivery of gaseous reactants, typically hydrogen and oxygen, for an electrochemical fuel cell reaction. In the fuel cell reaction, hydrogen gas is introduced at the anode where it reacts electrochemically in the presence of the catalyst to produce electrons and protons. The electrons are conducted from the anode to the cathode through an electrical circuit formed therebetween. Simultaneously, the protons pass through the electrolyte to the cathode where oxygen reacts electrochemically in the presence of the electrolyte and catalyst to produce oxygen anions. The oxygen anions react with the protons to form water as a reaction product.

A pair of electrically conductive contact elements or bipolar plates generally sandwich the MEA to complete a single PEM fuel cell. Bipolar plates serve as current collectors for the anode and cathode, and have appropriate flow channels and openings formed therein for distributing the fuel cell's gaseous reactants (i.e., the $H_2$ & $O_2$/air) over the surfaces of the electrodes. Bipolar plates can be assembled by bonding together two unipolar plates having the flow distribution fields formed thereon. Typically, bipolar plates also include inlet and outlet headers which, when aligned in a fuel cell stack, form internal supply and exhaust manifolds for directing the fuel cell's gaseous reactants and liquid coolant to and from, respectively, a plurality of anodes and cathodes.

As is well understood in the art, the membranes within the fuel cell need to have a certain relative humidity to maintain an ionic resistance across the membrane within a desired range to effectively conduct protons. During operation of the fuel cell, moisture from the fuel cell electrochemical reaction and from external humidification may enter the flow channels of the bipolar plates. As moisture is forced along the flow channels by a pressure of reactant gases, the highest concentration of water exists at the outlet regions of the bipolar plates, where reactant gas shear is lowest. Water can accumulate on surfaces in these regions. When the fuel cell is present as part of the fuel cell stack, water vapor is also exhausted to an outlet manifold where the exhausted water vapor condenses on cooler surfaces and drips or runs down the sides of the manifold.

Stagnant water can block flow channels and reduce the overall efficiency of the fuel cell. Liquid water that contacts an edge of the bipolar plate can be pulled into the bipolar plate flow channels by capillary action. Bipolar plates having a hydrophilic treatment are particularly susceptive to the capillary action of liquid water that accumulates at the edge of the bipolar plates. A high degree of water accumulation or stagnation can also lead to fuel cell failure, particularly following a shut-down period under freezing ambient conditions where the accumulated water turns to ice. Both accumulated water and ice may cause gas starvation. Gas starvation is know to result in carbon corrosion when the starved fuel cell is one of a number of fuel cells in the fuel cell stack having an electrical load applied thereto.

A known strategy for militating against water stagnation includes high flow purging of the fuel cell stack to force accumulated water from the fuel cells. Typical fuel cell stacks have also employed supplemental heating, for example, through electrical resistance at start-up to melt ice having formed during a shut-down in freezing conditions. These methods require active controls, however, and undesirably add to a complexity and cost of a system including the fuel cell.

There is a continuing need for a water management feature that transports accumulating water away from fuel cells in a fuel cell stack. Desirably, the feature is passive and improves fuel cell performance, particularly after a shut-down period under freezing ambient conditions.

SUMMARY OF THE INVENTION

In concordance with the instant disclosure, a water management feature that passively transports accumulating water away from the fuel cells and improves fuel cell performance, particularly after a shut down period under freezing ambient conditions, is surprisingly discovered.

In one embodiment an electric insulator for a fuel cell stack having a plurality of fuel cell plates includes an insulation layer having a water management feature adapted to militate against water contacting the fuel cell plates.

In another embodiment, the fuel cell stack includes the plurality of fuel cell plates arranged in a stack. Each fuel cell plate has an aperture formed therein, the apertures substantially aligned to form a manifold. A pair of compression plates is arranged to have the plurality of fuel cell plates disposed therebetween. A current collector is disposed between the stack and one of the compression plates. The electric insulator includes the water management feature and is disposed in the stack manifold. The water management feature is adapted to militate against water contacting the fuel cell plates.

In a further embodiment, the water management feature is an independent component coupled to at least one of the plurality of fuel cell plates, the current collector, and the electric insulator.

DRAWINGS

The above, as well as other advantages of the present disclosure, will become readily apparent to those skilled in the art from the following detailed description, particularly when considered in the light of the drawings described hereafter.

DETAILED DESCRIPTION OF THE INVENTION

Figure 1:
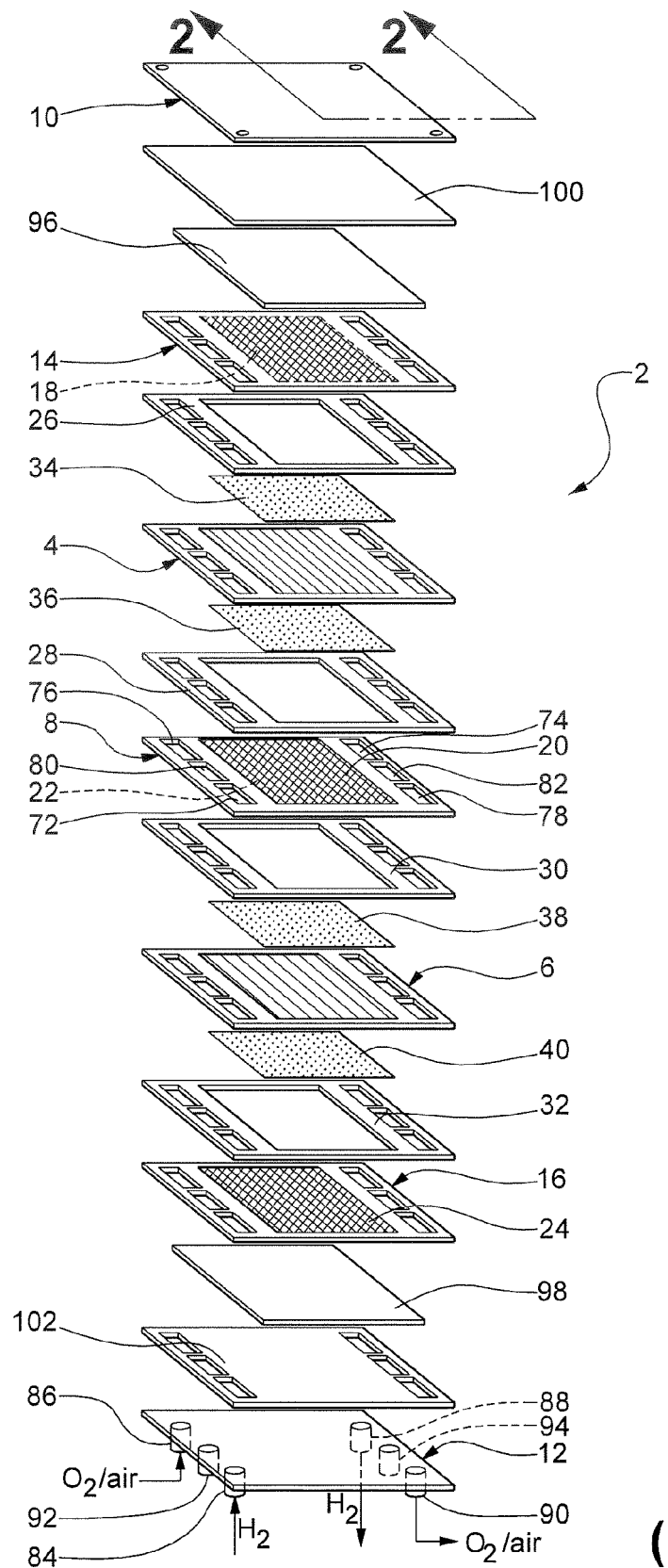
FIG. 1 illustrates a schematic, exploded perspective view of a PEM fuel cell stack of the prior art (only two cells shown)

The following description is merely exemplary in nature and is not intended to limit the present disclosure, application, or uses. It should also be understood that throughout the drawings, corresponding reference numerals indicate like or corresponding parts and features.

FIG. 1 depicts a two cell PEM fuel cell stack 2 of the prior art having a pair of MEAs 4, 6 separated from each other by an electrically conductive bipolar plate 8. For simplicity, only a two-cell stack (i.e. one bipolar plate) is illustrated and described in FIG. 1, it being understood that a typical fuel cell stack will have many more such cells and bipolar plates.

The MEAs 4, 6 and bipolar plate 8 are stacked together between a pair of compression plates 10, 12 and a pair of unipolar end plates 14, 16. The unipolar end plate 14, both working faces of the bipolar plate 8, and the unipolar end plate 16 include respective flow fields 18, 20, 22, 24. The flow fields 18, 20, 22, 24 distribute hydrogen gas and air over an anode and a cathode, respectively, of the MEAs 4, 6. Nonconductive gaskets 26, 28, 30, 32 provide seals and an electrical insulation between the several components of the fuel cell stack 2.

Gas-permeable diffusion media 34, 36, 38, 40 abut the anodes and the cathodes of the MEAs 4, 6. The end plates 14, 16 are disposed adjacent the diffusion media 34, 40, respectively, while the bipolar plate 8 is disposed adjacent the diffusion media 36 on the anode face of MEA 4. The bipolar plate 8 is further disposed adjacent to the diffusion media 38 on the cathode face of MEA 6.

The bipolar plate 8, unipolar end plates 14, 16, and the gaskets 26, 28, 30, 32 each include an anode supply aperture 72 and an anode exhaust aperture 74, and a cathode supply aperture 76 and a cathode exhaust aperture 78. The bipolar plate 8, unipolar end plates 14, 16, and the gaskets 26, 28, 30, 32 also include a coolant supply aperture 80 and a coolant exhaust aperture 82. Supply manifolds and exhaust manifolds of the fuel cell stack 2 are formed by an alignment of the respective apertures 72, 74, 76, 78, 80, 82 in the bipolar plate 8, unipolar end plates 14, 16, and the gaskets 26, 28, 30, 32. The hydrogen gas is supplied to an anode supply manifold via an anode inlet conduit 84. The air is supplied to a cathode supply manifold of the fuel cell stack 2 via a cathode inlet conduit 86. An anode outlet conduit 88 and a cathode outlet conduit 90 are also provided for an anode exhaust manifold and a cathode exhaust manifold, respectively. A coolant inlet conduit 92 is provided for supplying liquid coolant to a coolant supply manifold. A coolant outlet conduit 94 is provided for removing coolant from a coolant exhaust manifold. It should be understood that the configurations of the various inlets 84, 86, 92 and outlets 88, 90, 94 in FIG. 1 are for the purpose of illustration, and other configurations may be chosen as desired.

The fuel cell stack 2 further includes conductive current collectors 96, 98 that abut the unipolar plates 14, 16. The current collectors 96, 98 are adapted to carry current produced by the fuel cell stack 2 to an external load, for example. The compression plates 10, 12 are electrically insulated from the current collectors 96, 98 by dielectric coatings or electric insulators 100, 102.

Figure 2:
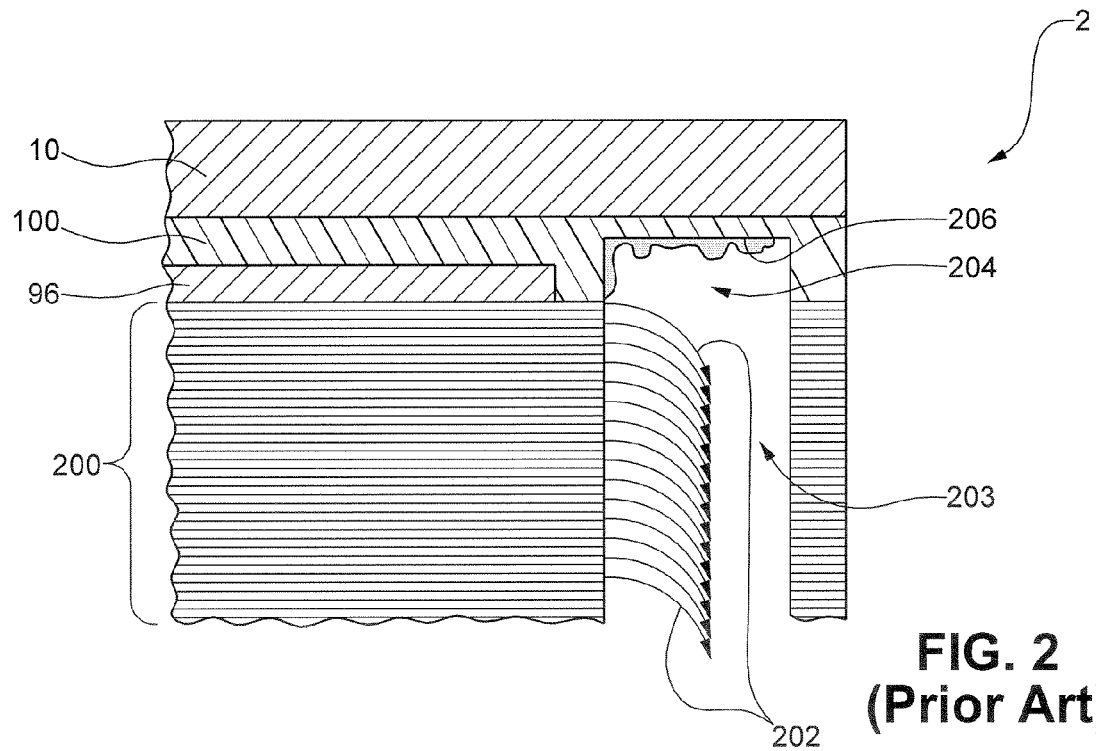
FIG. 2 is a fragmentary, cross-sectional view of the prior art fuel cell stack shown in FIG. 2 taken along line 2-2.

As shown in FIG. 2, a typical design of the fuel cell stack 2 has a plurality of fuel cell plates 200 arranged in a stack, in which the bipolar plate 8 and the unipolar plates 14, 16 are included. Exhaust gases 202, including water vapor, are exhausted from the plurality of fuel cell plates 200 into at least one of the cathode and anode exhaust manifold during an operation of the fuel cell stack 2. Near an upper or "dry" end of the fuel cell stack 2, where reactant pressure and gas shear may be lowest, a stagnant region 204 may exist. The water vapor from the exhaust gases 202 is known to condense on inner surfaces 206 in the stagnant region 204, for example, on the inner surface 206 of the electric insulator 100. The inner surfaces 206 are generally cooler than the exhaust gases 202 due to a heat transfer to the ambient atmosphere surrounding the fuel cell stack 2 from the electric insulator 100. The condensed water may drip onto, or otherwise accumulate on, the edges of the fuel cell plates 200. A blockage of the fuel cell plates 200 with the condensed water or ice following formation thereof under freezing conditions is known to occur with the typical designs, such as shown in FIG. 2.

Referring now to FIGS. 3 to 6, various embodiments of the present disclosure are shown. Similar structure to that described above for FIGS. 1 and 2 repeated herein with respect to FIGS. 3 to 6 include the same reference numeral and a prime (') symbol for purpose of clarity.

Figure 3:
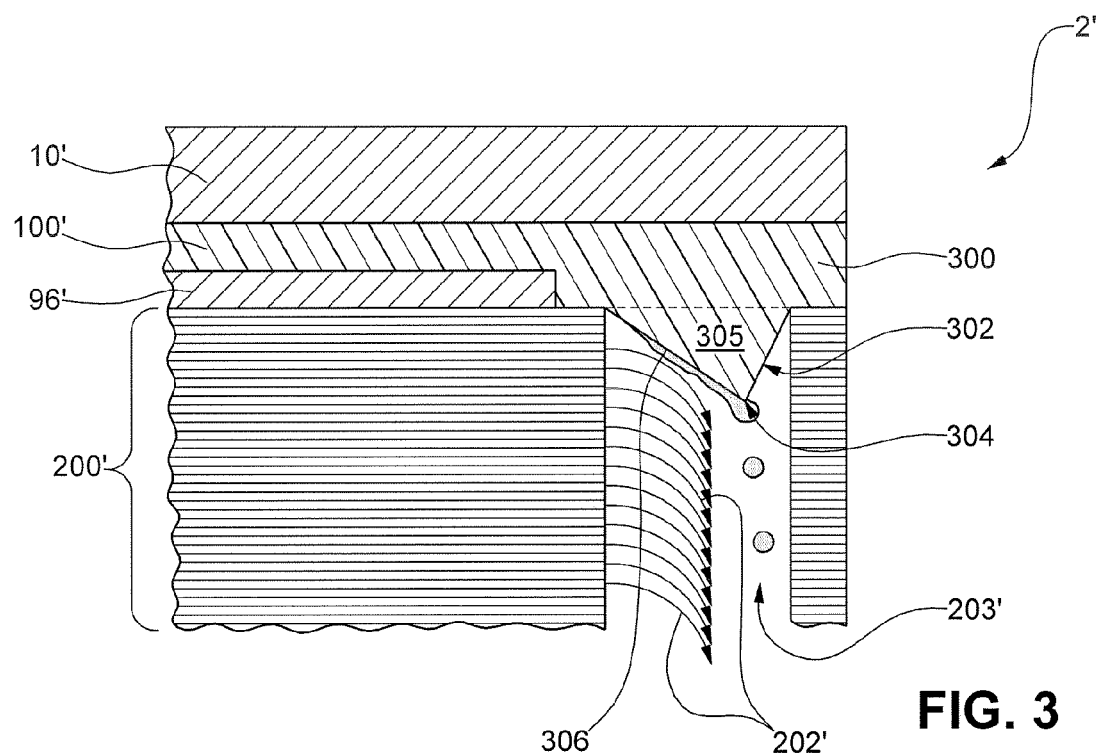
FIG. 3 is a fragmentary, cross-section view of a fuel cell stack according to an embodiment of the present disclosure, having a water management feature in the exhaust manifold.

In FIG. 3, the fuel cell stack 2' includes an electric insulator 100' having an insulation layer 300 with a water management feature 302 formed thereon. The water management feature 302 is adapted to militate against water contacting the plurality of fuel cell plates 200'. For example, the water management feature 302 may force liquid water away from the fuel cell plate 200' outlets by at least one of gravity and gas shear. The water management feature 302 depends from the insulation layer 300 and may be one of formed integrally with the insulation layer 300 and coupled to the insulation layer 300 as desired. For example, the water management feature 302 may be coupled to the insulation layer with one of an adhesive and a mechanical fastener. Other suitable means for coupling the water management feature 302 with the insulation layer 300 may also be employed.

The water management feature 302 depends from the insulation layer 300 and terminates at a terminus 304. The terminus 304 is spaced from the plurality of fuel cell plates 200' in the assembled fuel cell stack 2'. For example, the terminus 304 is disposed substantially adjacent a horizontal center of the exhaust manifold 203'. The terminus 304 may be disposed distal from the insulation layer 300, and is adapted for condensed and accumulated water to collect at the terminus 304 and drip therefrom and away from the edges of the fuel cell plates 200'.

As shown in FIG. 3, the terminus 304 may be an edge or point, for example, wherein the water management feature 302 has a substantially triangular cross-sectional shape. The water management feature 302 may be a wedge 305, for example, disposed on the insulation layer 300. A skilled artisan should understand that the terminus 304 may be rounded, and that the particular shape of the terminus 304 may be selected as desired.

A surface 306 is formed on the water management feature 302 between the insulation layer 300 and the terminus 304. The surface 306 may be substantially planar. In a particularly illustrative embodiment, the surface 306 is disposed at a slope with respect to the insulation layer 300 sufficient for the water that condenses thereon to be drawn by the force of gravity to the terminus 304. The water may then drip from the terminus 304. The slope of the surface 306 is also sufficient for the exhaust gases 202' to contact the surface 306, resulting in gas shear that causes condensed water to migrate to the terminus 304. The slope of the surface 306 may also be selected to militate against an undesirable blockage of the exhaust gases 202' from the fuel cell plates 200' that may occur, for example, if the selected slope disposed the surface 306 in sufficient proximity to the edge of the fuel cell plates 200'.

It should be understood that the electric insulator 100' can be formed from any conventional nonconductive material, for example, one of a substantially nonconductive elastomeric, thermoplastic, and composite material. In a particular embodiment, the electric insulator 100' is formed from a substantially rigid, nonconductive plastic material. The water management feature 302 is formed from a material that facilitates the drawing away of water from the fuel cell plates 200'. For example, the water management feature 302 may be formed from the same nonconductive material of the insulation layer 300. Other suitable materials for the water management feature include conductive and semi-conductive materials. As a nonlimiting example, the water management feature 302 may be formed from a conductive material, such as aluminum or stainless steel.

In a further embodiment, the surface 306 of the water management feature 302 may have a treatment that further facilitates the drawing of water away from the fuel cell plates 200'. As nonlimiting examples, the surface treatment may include at least one of a surface texturing, a coating, for example with at least one of a hydrophilic coating and a hydrophilic coating, and a plasma treatment.

Suitable surface texturing includes a matte finish. The matte finish may be created, for example, by sandblasting. The surface 306 may also be etched, for example, chemically, to provide a desired degree of roughness. Further, the surface 306 of the water management feature 302 may include microcorrugation or microchannels adapted to draw water away from the fuel cell plates 200' and toward the terminus 304. The microchannels may be adapted to facilitate a capillary driven flow of condensed water away from the fuel cell plates 200'.

As nonlimiting examples, in copending U.S. patent application Ser. Nos. 11/068,489, 11/463,386, and 11/463,384, incorporated herein by reference, suitable hydrophilic coatings are described. The hydrophilic coating can include at least one Si—O group, at least one polar group and at least one group including a saturated or unsaturated carbon chain, for example. Suitable hydrophobic coatings, for example, polytetrafluoroethylene (PTFE) and the like, are also known in the art and can be used as desired. It should also be appreciated that hydrophilic coatings and hydrophobic coatings may be used in an alternating, step-wise fashion to further direct the condensed water toward the terminus 304.

The plasma treatment may include exposure of the surface 306 to a high energy, atmospheric pressure plasma as is known in the art to modify the functionality of the surface 306. Functional groups that may be added to the surface 306 include, for example, —OH and —NH groups. The modified functionality may be adapted to make the surface 306 more hydrophilic, and consequently, easier to wet and draw the water away from the fuel cell plates 200'.

Figure 4:
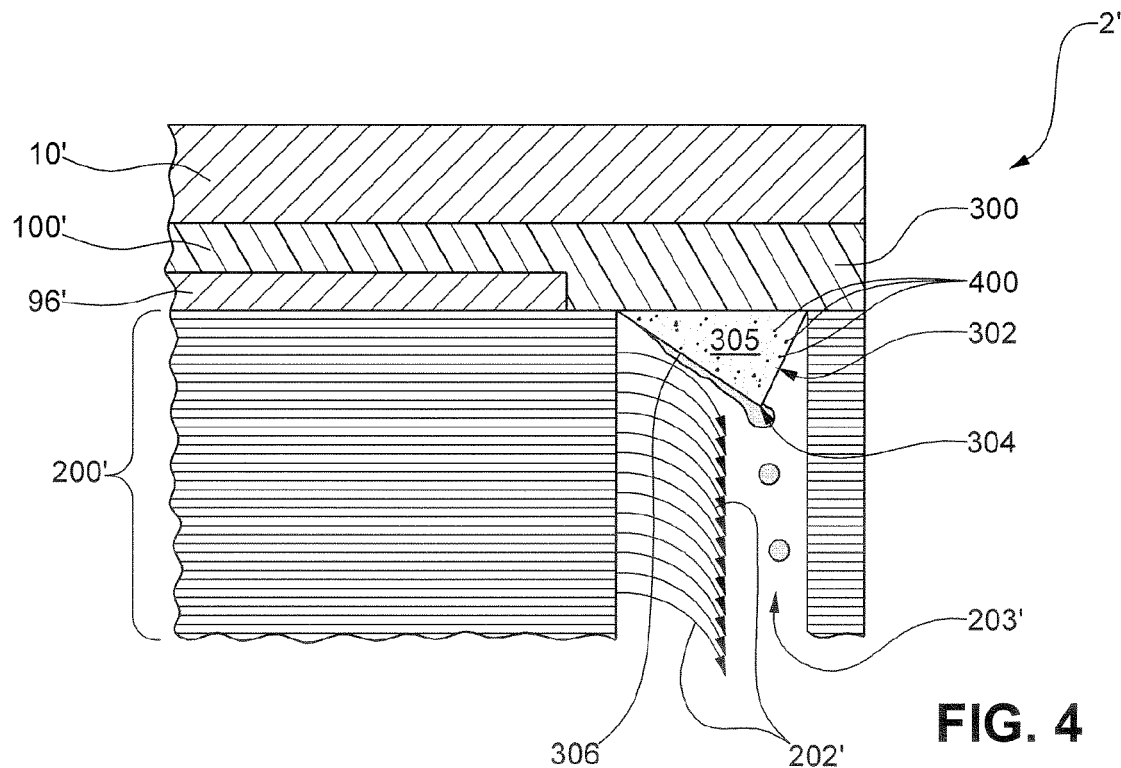
FIG. 4 is a fragmentary cross-sectional view of a fuel cell stack according to another embodiment of the present disclosure, having a porous water management feature in the exhaust manifold.

In another embodiment shown in FIG. 4, the water management feature 302 is formed from an absorbent material having a plurality of pores 400. Suitable absorbent materials may include foams, such as open cell foams and sintered bead foams, for example. The water management feature 302 absorbs the condensed water and, upon becoming substantially saturated with the condensed water, causes the water to drip from the terminus 304. The absorbent material may thereby facilitate the drawing of water away from the fuel cell plates 200' by a capillary force.

Figure 5:
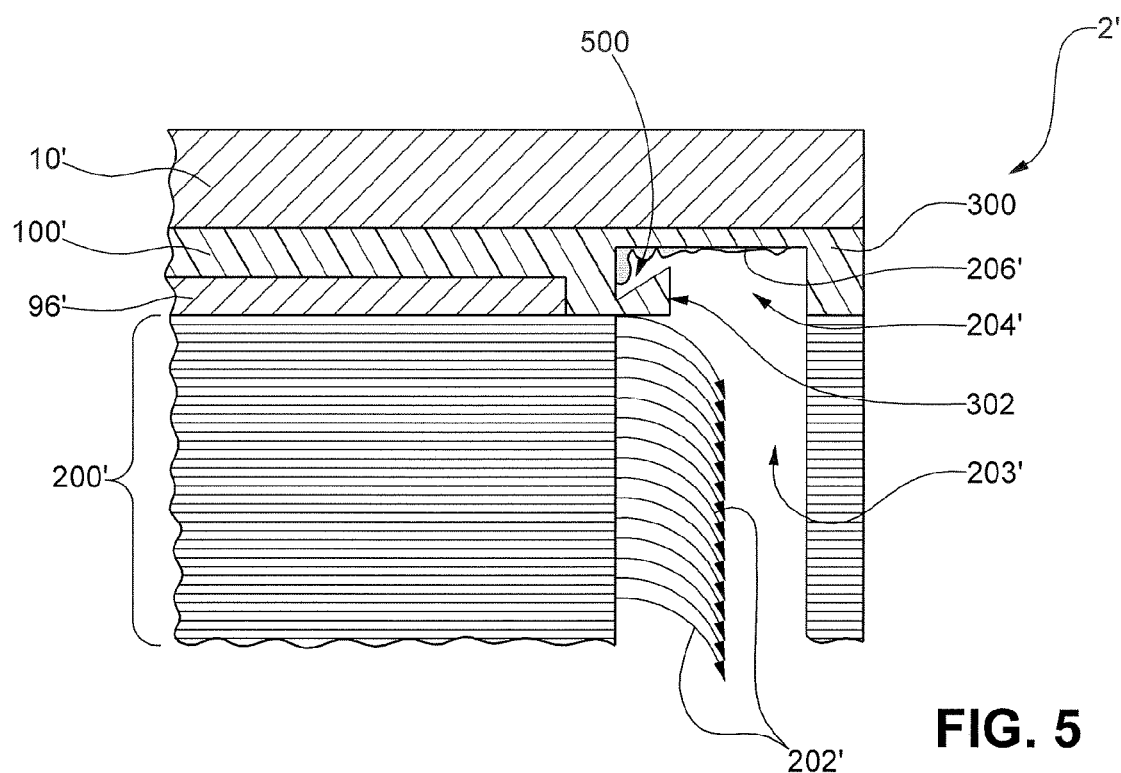
FIG. 5 is a fragmentary, cross-sectional view of a fuel cell stack according to a further embodiment of the present disclosure, having a water capture channel.

Referring now to FIG. 5, the water management feature 302 includes a water capture channel 500. The water capture channel 500 may be integrally formed with the insulation layer 300 or coupled to the insulation layer 300, as desired. The water capture channel 500 is disposed in the stagnant region 204' and is adapted to collect water that condenses on the inner surface 206' of the electric insulator 100'. The water capture channel 500 may have a pitch adapted to direct the water collected therein to a drainage area (not shown) of the fuel cell stack 2', for example, under the force of gravity. The water capture channel thereby militates against a dripping of water on to the edges of the fuel cell plates 200'.

Figure 6:
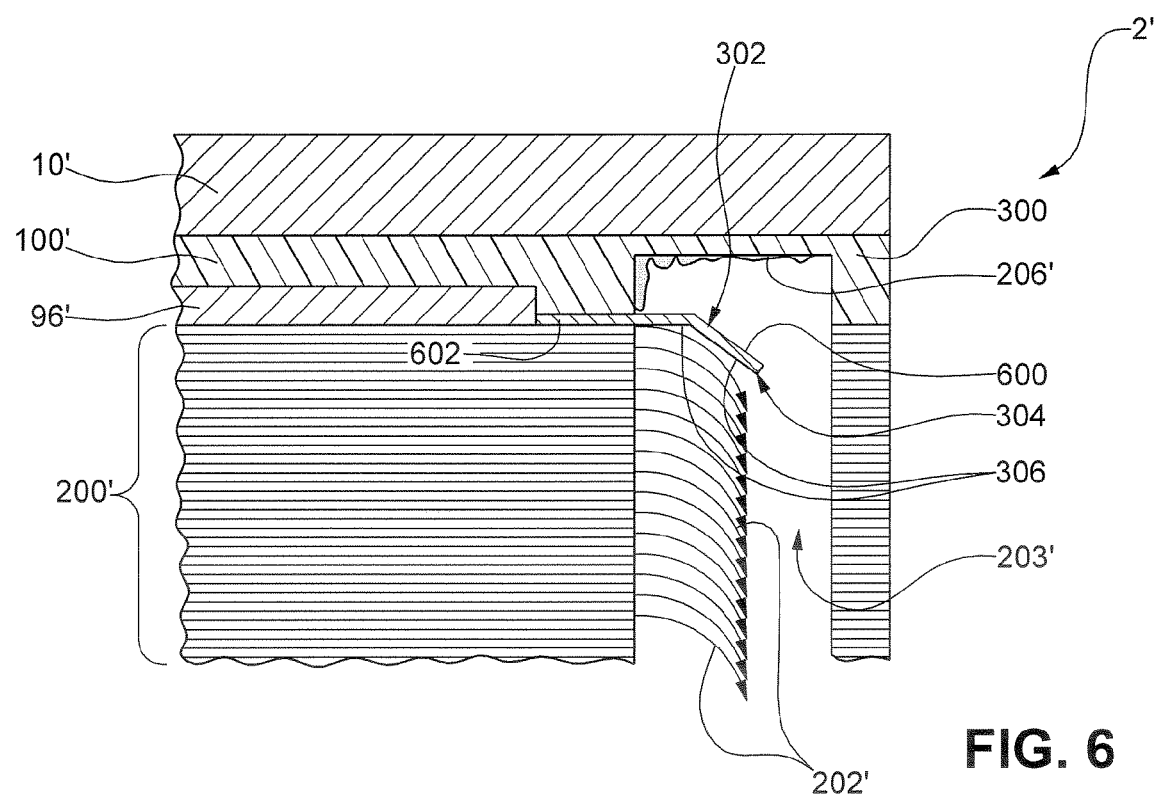
FIG. 6 is a fragmentary, cross-sectional view of a fuel cell stack according to an additional embodiment of the present disclosure, having a fin.

With reference to FIG. 6, the water management feature 302 may include a fin 600. The fin 600 may be coupled to at least one of the plurality of fuel cell plates 200', the current collector 96', and the electric insulator 100'. For example, the fin 600 may have a fin portion 602 that is disposed between the electric insulator 100' and an end of the plurality of fuel cell plates 200', for example, a unipolar plate. The fin portion 602 may also depend from the electric insulator 100', if desired. In further embodiments, the fin 600 is formed integrally with one of the plurality of fuel cell plates 200', the current collector 96', and the electric insulator 100'. In a further embodiment, the fin 500 may be integrated into a gasket assembly.

The fin 600 is generally substantially planar, although it should be understood that other suitable configurations may be employed. The terminus 304 of the water management feature 302 is an end of the fin 600 disposed in the exhaust manifold 203'. The surface 306 of the water management feature 302 is defined by an inner surface of the fin 600.

It should be appreciated that at least one of the water capture channel 500 and the fin 600 may be used in isolation or in combination with the wedge 305 described hereinabove. The water capture channel 500 may also have a treatment as described herein with respect to the surface 306, to further facilitate the collection and drawing of water away from the fuel cell plates 200'.

The fuel cell stack 2' having the water management feature 302 of the present disclosure is advantageous over the fuel cell stack 2 known in the art. The water management feature 302 facilitates the removal of otherwise required componentry, such as heaters and pumps, and employs the flow of the reactant gases and the geometry of the fuel cell stack 2' to draw water away from the fuel cell plates 200'. It is surprisingly found that the water management feature 302 militates against a blockage of the fuel cell plates 200', particularly following a shut-down period under freezing ambient conditions. Under such conditions, ice that would normally block the edges of, and thus the outlet of reactant gases from, the fuel cell plates 200' does not form. Thus, a maldistribution of reactant gas flow among the plurality of fuel cells in the fuel cell stack 2' is militated against. Unexpectedly, the water management feature 302 also allows for an optimized purge time during a purging of the fuel cell stack 2' during a start-up operation. A performance of the fuel cell stack 2' is thereby maximized with the water management feature 302 described herein.

While certain representative embodiments and details have been shown for purposes of illustrating the invention, it will be apparent to those skilled in the art that various changes may be made without departing from the scope of the disclosure, which is further described in the following appended claims.

What is claimed is:

1. An electric insulator for a fuel cell stack comprising:
    an insulation layer disposed between a compression plate and a current collector; and
    a water management feature depending from the insulation layer, wherein the water management feature militates against water contacting fuel cell plates of the fuel cell stack.

2. The electric insulator of claim 1, wherein the water management feature has a terminus formed thereon.

3. The electric insulator of claim 2, wherein the water management feature is a wedge.

4. The electric insulator of claim 2, wherein the water management feature is a fin.

5. The electric insulator of claim 1, wherein the water management feature is integrally formed with the insulation layer.

6. The electric insulator of claim 1, wherein the water management feature is coupled to the insulation layer.

7. The electric insulator of claim 6, wherein the water management feature is coupled to the insulation layer with at least one selected from the group consisting of an adhesive and a mechanical fastener.

8. The electric insulator of claim 1, wherein the water management feature is formed from an absorbent material.

9. The electric insulator of claim 8, wherein the absorbent material is a foam.

10. The electric insulator of claim 1, wherein a surface of the water management feature is treated to facilitate the collection and removal of water.

11. The electric insulator of claim 10, wherein the surface of the water management feature is treated by at least one selected from the group consisting of a surface texturing, a hydrophobic coating, a hydrophilic coating, and a plasma treatment.

12. The electric insulator of claim 10, wherein the surface of the water management feature includes microchannels formed therein.

13. A fuel cell stack, comprising:
    a pair of compression plates;
    a plurality of fuel cell plates arranged in a stack between the compression plates, each fuel cell plate having an aperture formed therein, the apertures substantially aligned to form a manifold;
    a current collector disposed between the fuel cell plates and one of the compression plates; and
    an electric insulator disposed between the current collector and the one of the compression plates, the electric insulator including a water management feature depending from the electric insulator that militates against water contacting the fuel cell plates.

14. The fuel cell stack of claim 13, wherein the water management feature extends into the manifold of the fuel cell stack and includes a terminus spaced from the fuel cell plates.

15. The fuel cell stack of claim 14, wherein the water management feature is a wedge.

16. A fuel cell stack comprising:
    a pair of compression plates;
    a plurality of fuel cell plates arranged in a stack between the compression plates, each fuel cell plate having an aperture formed therein, the apertures substantially aligned to form a manifold;
    a current collector disposed between the fuel cell plates and one of the compression plates;
    an electric insulator disposed between the current collector and said one of the compression plates; and
    a water management feature coupled to at least one selected from the group consisting of the plurality of fuel cell plates, the current collector, and the electric insulator, wherein the water management feature is a fin extending into the manifold, the fin having a portion disposed between the electric insulator and an end of the fuel cell stack, the water management feature militating against water contacting the fuel cell plates.

* * * * *